May 5, 1936.    C. H. AYARS    2,039,276
FRUIT AND VEGETABLE WASHER
Filed Nov. 14, 1934    3 Sheets-Sheet 1

INVENTOR
Charles H. Ayars
BY
ATTORNEY

May 5, 1936.   C. H. AYARS   2,039,276
FRUIT AND VEGETABLE WASHER
Filed Nov. 14, 1934   3 Sheets-Sheet 2
FIG_3_
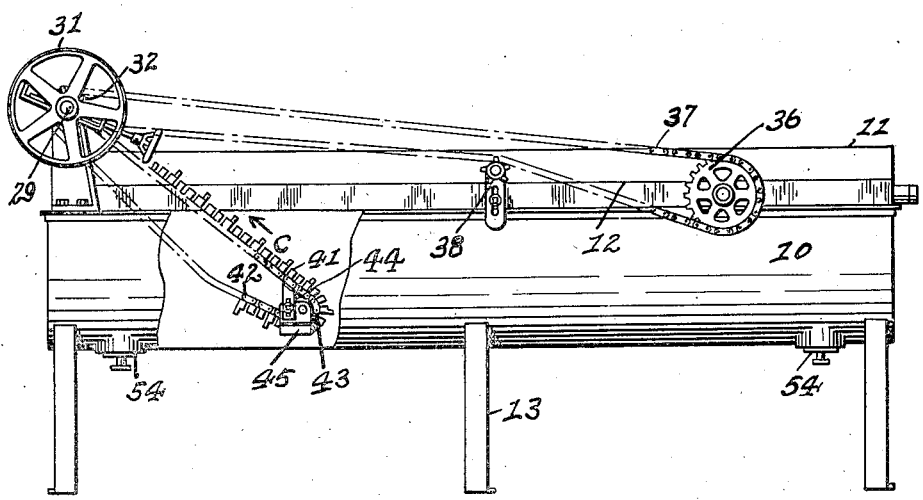
FIG_11_
FIG_4_
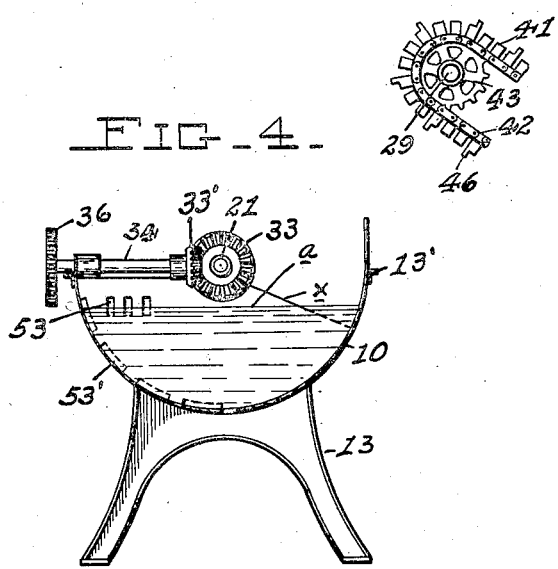
FIG_10_
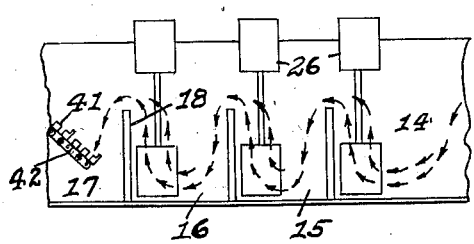
INVENTOR
Charles H. Ayars
BY
ATTORNEY May 5, 1936.　　　C. H. AYARS　　　2,039,276

FRUIT AND VEGETABLE WASHER

Filed Nov. 14, 1934　　　3 Sheets-Sheet 3

INVENTOR
Charles H. Ayars
BY
ATTORNEY

Patented May 5, 1936

2,039,276

UNITED STATES PATENT OFFICE 2,039,276

FRUIT AND VEGETABLE WASHER

Charles H. Ayars, Salem, N. J., assignor to Ayars Machine Company, Salem, N. J., a corporation of New Jersey Application November 14, 1934, Serial No. 752,954

6 Claims. (Cl. 146—197)

My invention relates to machines for washing fruit, vegetables and the like and particularly to a machine in which the articles to be washed are subjected throughout their passage to a whirling action of the washing fluid.

The object of the invention is to provide an improved and efficient fruit and vegetable washer.

Another object is to provide a washer which will cleanse all larvæ from the commodity and will wash out all decayed spots therefrom.

Still another object is to provide an efficient washer which will have large capacity, and from which the commodity may be passed to other apparatus for further action without the necessity for any further cleansing.

According to the invention, the improved fruit and vegetable washer comprises a longitudinal body, U-shaped in section and having a series of partitions dividing the interior into bins, a longitudinal shaft, multiple paddles on the shaft for each bin, said paddles operating in a portion of the bin only, and shaped to pass the commodity being cleansed from one bin to its neighbor, and means for automatically removing the commodity from the machine after its passage through the successive bins. The partitions are cut away at one side of the body, and openings are provided therein on the other side of the body whereby the rotation of the paddles sets up a constant whirling action of the cleansing fluid which passes down the length of one side of the body and back on the other side. The rotation of the paddles also sets up a constant whirling action of the fluid in each bin, and the commodity is drawn thereby into the path of the paddles which convey it over the partition into the next bin. Suitable means are also provided for giving the commodity a final wash during passage from the machine.

The drawings illustrate an embodiment of the invention and the views therein are as follows:

Fig. 3 is a side elevation showing a part of the body broken away to disclose the discharge rack.

Fig. 4 is a cross-sectional view with parts omitted to show the shape of the partitions forming the bins.

Fig. 10 is a diagrammatic view showing the whirling action of the washing fluid when the paddles are set in motion.

Fig. 11 is a small detail showing the sprocket at the top of the discharge rack.

Figure 1:
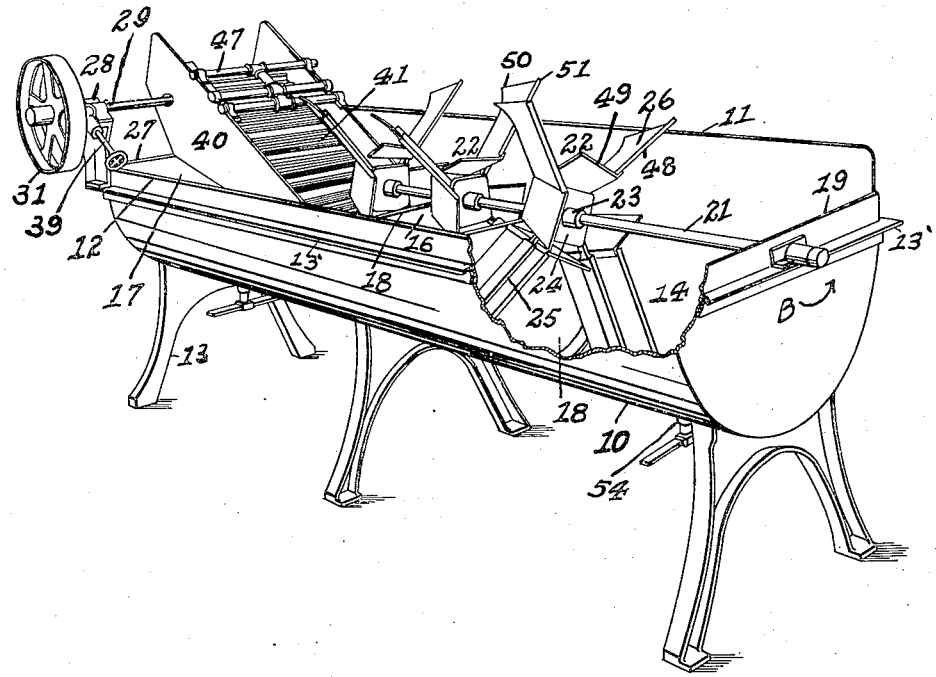
Fig. 1 is a perspective view of the machine, showing a portion of the body broken away, and with the paddles and a part of the operating mechanism omitted.

As illustrated in the drawings, the body 10 of the machine is U-shaped in section, one leg or side 11 extending higher than the other leg or side 12. The body is supported on standards 13 and each side and end of the body is provided with a horizontally extending angle bar 13'.

The body is filled with cleansing fluid, water or solutions as desired, and its height is maintained as later explained.

The machine illustrated shows the interior of the body divided into four bins 14, 15, 16, and 17, but it is not intended that any limitation shall be imposed thereby as the intermediate bins 15 and 16 may be increased in number as found most expedient for the class of work to be performed.

The bins are formed by partitions 18 and the partitions and the wall 19 at the delivery end of the body are provided with means 20 for housing a longitudinal shaft 21, which is disposed on the radial center-line of the curved bottom of the body.

In close proximity to each of the partitions 18 is a paddle wheel 22. This wheel has a hub 23 and an integral plate 24 to which are attached arms 25 for supporting the paddles blades 26. The hubs 23 fit onto the shaft 21 and are secured thereto by key or set screw as desired. The shape an contour of these paddle blades will be explained later.

Mounted on the angle bars 13' at a point near the wall 27 at the discharge end of the body are bearing housings 28, which support a shaft 29. This shaft has a hand wheel 30 at one end thereof and a pulley 31 at the other end, and is provided with a sprocket wheel 32 between the pulley and the side of the body 12. A clutch (not shown) may be mounted on the shaft 29 and operated by the usual shipper handle for operatively connecting the pulley 31 with said shaft.

At a point over the bin 14 a bevel gear 33 is fixed to the shaft 21 and this gear meshes with a bevel gear 33' on the inner end of a stub shaft 34. This stub shaft is journalled in a part 35 which is supported between the body wall 12 and the shaft 21, and its outer end is provided with a sprocket wheel 36. A sprocket chain 37 extends between the sprockets 32 and 36, and a take-up member 38 is mounted intermediate the same. A cover or guard (not shown) is usually provided for concealing the chain and the sprockets and to prevent injury to persons having to do with the apparatus. The bearings in the housings 28 are adjustable through the medium of the screws 39.

Supported on the wall 27 are a pair of side brackets 40 which confine an endless rack 41. This rack is attached to sprocket chains 42 which operate over sprocket wheels, one of the lower ones 43 being shown on the shaft 44 in the housing 45, while the upper ones are secured to the shaft 29 as shown in Fig. 11. The rack has transverse flange members 46 spaced throughout its length for supporting the fruit or vegetables and for raising same from the bin 17. This rack is located toward one side of the tank as will later be explained.

Supported across the brackets 40 are a series of spray pipes 47 (see Fig. 1) which are supplied with liquid under pressure from any source, and while in the present drawings three of such pipes are shown, the number may be increased or decreased at will.

Figure 2:
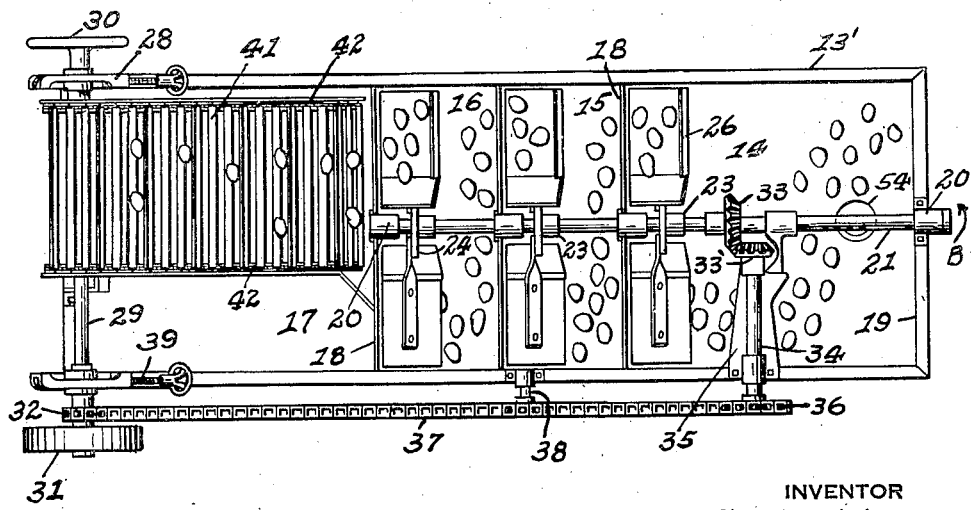
Fig. 2 is a top plan view of the machine with the spray pipes omitted.
Figure 5:
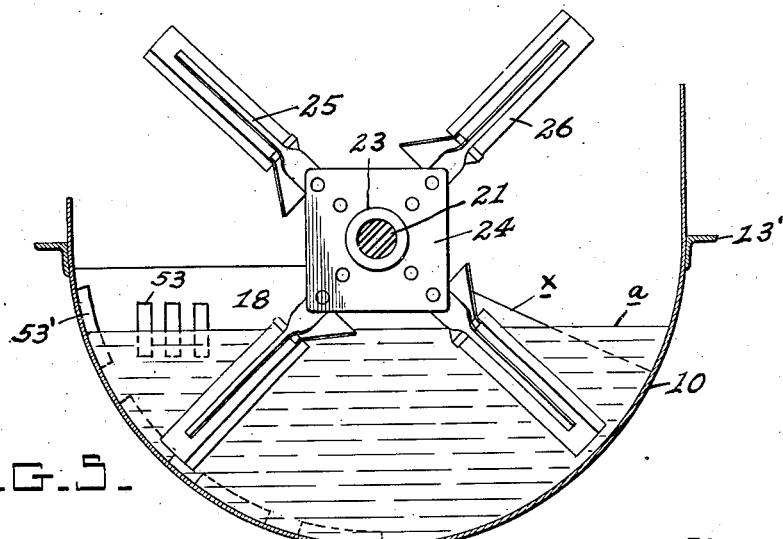
Fig. 5 is an enlarged cross-sectional view of the body showing the multiple paddle employed in each of the bins.

In Figs. 1, 2, and 5 the paddle blade 26 is shown as comprising a substantially radially disposed part 48 and an inwardly deflected part 49. The radially disposed part has one of its outer sides 50 turned inwardly to act as a scoop when taking the fruit or vegetables from the bottom of the bin, while on its other side it has a flange 51 to prevent the articles from being washed therefrom during elevation.

Figures 6, 7:
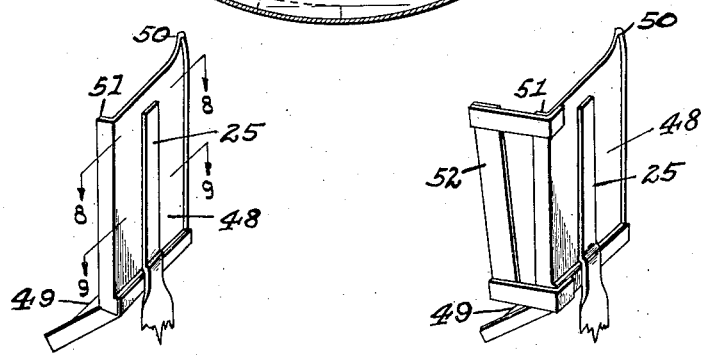
Fig. 6 is a perspective view of one form of paddle blade employed.
Fig. 7 is a like view of a built-up paddle blade.
Figures 8, 9:
Fig. 8 is a cross-sectional view on the line 8—8 of Fig. 6.
Fig. 9 is a like view on the line 9—9 of Fig. 8.

Fig. 7 shows the blade 26 with an additional side member 52 above the flange 51. If desired, this may be made integral with said blade or may be fastened thereto by any suitable means.

The partitions 18 forming the bins are located so that on one side of the shaft the upper end thereof is horizontal, while on the other side it tapers downwardly as at $x$ (see Fig. 4) toward the body wall. The liquid is maintained at a level $a$ above the lower part of the taper $x$ of the partition by regulation of the admission of fluid from the spray pipes 47 and adjustment of the sand gates 54. On the horizontal side the partition is provided with a series of openings or slots 53 and with arcuate openings 53'.

The shaft 21 rotates in the direction shown by the arrows B.

The operation of the improved fruit and vegetable washer is as follows: Cleansing fluid is first admitted to the hollow body and maintained at or about the level $a$ shown in Fig. 4 through the admission from the spray pipes 47 and adjustment of the gates 54. When the clutch is thrown in, power is supplied from any source to the shaft 29 which, through the sprockets 32 and 36 and the chain 37, operates the stub shaft 34 and the latter shaft, through bevel gears 33 and 33' operates the longitudinal shaft 21 to which the paddles are fixed.

At the same time, the chains 42 operate the endless rack 41 in the direction of the arrow C.

The fruit or vegetables to be cleaned are dumped into the bin 14 over the end wall 19, and the action of the paddle wheel therein causes them to take a whirling motion as illustrated in Fig. 2.

This whirling action carries the commodity upward at the bottom of the bin in the pathway of the paddles and the commodity is thereby raised and confined on the paddle by virtue of its shape. When the particular paddle bearing fruit or vegetables reaches the tapered part of the partition, the commodity is washed into the bin 15. Of course, some of the fluid from bin 14 is also passed into bin 15, and this causes a circulation of fluid along that side of the body. The fruit or vegetables washed into bin 15 take a course like that illustrated in Fig. 2 by reason of the whirling action of the fluid caused by the paddles in that bin, and again they are carried into the path of this second paddle wheel and in like manner passed to the succeeding bin.

Bin 17 has no paddle wheel, hence there is no whirling of the fluid therein, so that when the commodity is washed over the partition in that bin it sinks onto the endless rack 41 and is elevated from the cleansing fluid. However, during this elevation, the commodity receives a final wash from the spray pipes 47, thereby insuring a perfectly clean article free from all larvae, sand and decayed spots.

It will, of course, be readily seen that there is a constant movement of the cleansing fluid down that side of the body where the tapered walls of the partitions are located and the openings 53 and 53' provide means for circulating said fluid back along the other side of the body so that uniform height of fluid is constantly maintained in each bin. This movement of the cleansing fluid is somewhat independent of the whirling movement of the fluid in the bins 14, 15, and 16 caused by the location and action of the paddles therein. This whirling of the fluid, when the machine is run at the proper speed, is somewhat violent and therefore gives the necessary action for removing all impurities and decayed spots from the fruit or vegetables being acted upon.

The paddles operate through substantially one half of the length of the individual bins in the illustrations, but may be slightly greater or less in width without sacrificing any of the advantages of the machine, as the purpose is to so design both paddle and bin that the fruit or vegetables being cleansed may be subjected to a violent whirling action of the fluid and then passed into the path of the paddle blades and washed into the succeeding bin.

Of course the machine illustrated herein may be modified and changed in many and various respects without departing from the invention herein disclosed and hereafter claimed.

The invention is hereby claimed as follows:

1. A fruit and vegetable washing machine comprising a hollow body containing washing fluid, vertical partitions therein in the same horizontal plane and having a substantial part of their upper edges horizontally disposed above the fluid level and extending from one side of the body wall, the other sides of the partitions sloping downward to the other body wall and having their lower sloping edges below the fluid level, and paddles arranged to progressively pass a commodity over the sloping edges of said partitions herein.

2. A fruit and vegetable washing machine comprising a hollow body containing washing fluid, vertical partitions therein in the same horizontal plane and having a substantial part of their upper edges horizontally disposed above the fluid level and extending from one side of the body wall, the other sides of the partitions sloping downward to the other body wall and having their lower sloping edges below the fluid level, paddles arranged to progressively pass a commodity over the sloping edges of said partitions herein, and means for discharging the washed commodity from the machine.

3. A fruit and vegetable washing machine comprising a hollow body containing washing fluid, vertical partitions therein in the same horizontal plane and having a substantial part of their upper edges horizontally disposed above the fluid level and extending from one side of the body wall, the other sides of the partitions sloping downward to the other body wall and having their lower sloping edges below the fluid level, paddles arranged to progressively pass a commodity over the sloping edges of said partitions, means for discharging the washed commodity from the machine, and means for spraying same during discharge.

4. A fruit and vegetable washing machine comprising a hollow body containing washing fluid, vertical partitions therein in the same horizontal plane and having a substantial part of their upper edges horizontally disposed above the fluid level and extending from one side of the body wall, the other sides of the partitions sloping downward to the other body wall and having their lower edges below the fluid level, and paddle wheels which operate through substantially half of the width of the said bins, said paddles and partitions being shaped to cause a whirling action of the washing fluid in each bin and to progressively pass the commodity over the sloping sides of said partitions.

5. A fruit and vegetable washing machine comprising a hollow body containing washing fluid, vertical partitions therein in the same horizontal plane and having a substantial part of their upper edges horizontally disposed above the fluid level and extending from one side of the body wall, the other sides of the partitions sloping downward to the other body wall and having their lower sloping edges below the fluid level, paddle wheels arranged to operate through substantially half of the width of said bins and which pass the fluid over said partitions to cause a circulation of said fluid along that side of said body, and apertures below the horizontal sides of said partitions for circulating the fluid in the opposite direction to maintain a circulating system.

6. A fruit and vegetable washing machine comprising a hollow body containing washing fluid, vertical partitions therein in the same horizontal plane and having a substantial part of their upper edges horizontally disposed above the fluid level and extending from one side of the body wall, the other sides of the partitions sloping downward to the other body wall and having their lower sloping edges below the fluid level, paddle wheels arranged to operate through substantially half of the width of said bins and which pass the fluid over said partitions to cause a circulation of said fluid along that side of said body, and means arranged to provide circulation of the fluid in the opposite direction along the other body wall whereby a circulating system is maintained.

CHARLES H. AYARS.